United States Patent [19]

Bierhoff

[11] Patent Number: 4,628,497
[45] Date of Patent: Dec. 9, 1986

[54] APPARATUS FOR REPRODUCING INFORMATION FROM AN OPTICALLY READABLE RECORD CARRIER

[75] Inventor: Martinus P. M. Bierhoff, Eindhoven, Netherlands

[73] Assignee: U.S. Philips Corporation, New York, N.Y.

[21] Appl. No.: 578,459

[22] Filed: Feb. 9, 1984

[30] Foreign Application Priority Data

Oct. 17, 1983 [NL] Netherlands .......................... 8303562

[51] Int. Cl.⁴ ............................................... G11B 7/00
[52] U.S. Cl. ........................................ 369/44; 369/33; 369/50; 369/109
[58] Field of Search ................. 369/50, 32, 33, 43–47, 369/107, 109, 111; 250/201–204; 358/342

[56] References Cited

U.S. PATENT DOCUMENTS 4,488,275 12/1984 Ceshkovsky .......................... 369/44

Primary Examiner—Robert L. Richardson
Attorney, Agent, or Firm—Thomas A. Briody; Jack Oisher; Leroy Eason

[57] ABSTRACT

An apparatus for reading an optical record carrier on which information has been digitally recorded as a track of pit and land areas. The apparatus detects trackloss by comparing the amplitudes of the signals obtained from read-out of the pit areas with the signals obtained from read-out of the land areas. The signals are sampled in synchronism with the frequency of the digital bits stored on the record carrier and are processed digitally.

8 Claims, 14 Drawing Figures

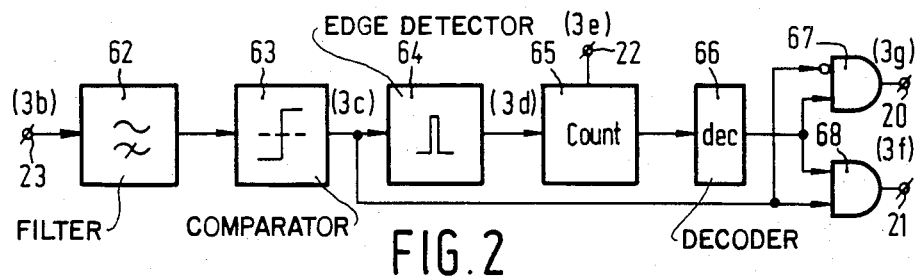
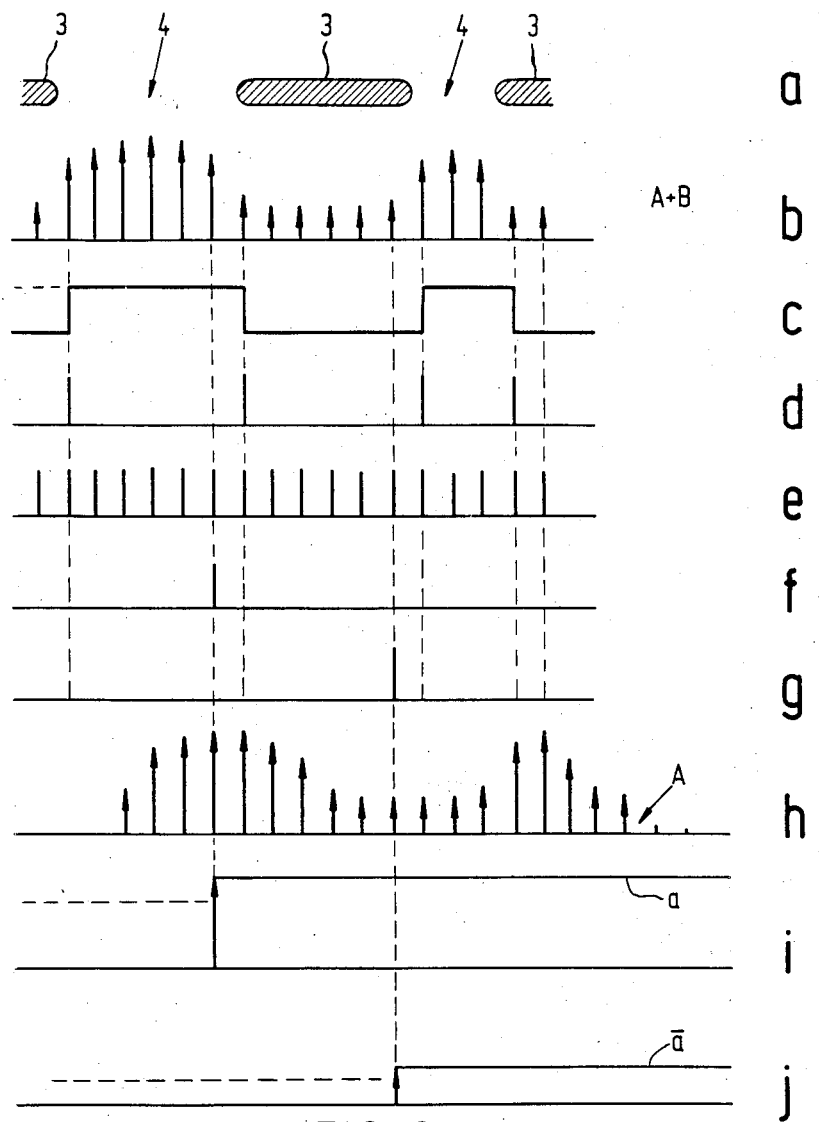

APPARATUS FOR REPRODUCING INFORMATION FROM AN OPTICALLY READABLE RECORD CARRIER

BACKGROUND OF THE INVENTION

1. Field of the Invention

The invention relates to an apparatus for reproducing information from an optically readable record carrier on which information is stored in the form of a track of optically detectable pit areas which alternate with intermediate land areas, which apparatus comprises:

an optical system for projecting a light beam on the record carrier, an optical detector for detecting the light beam which has been modulated by the record carrier and generating a detection signal which is determined by said modulation, and track-loss detection means for generating a track-loss signal which is an indication of a condition in which the spot produced by the light beam is positioned off the track to a specific extent.

2. Description of the Related Art

Apparatus of this general kind is utilized in the "compact disc digital audio player" which is commercially available from N. V. Philips' Gloeilampenfabrieken under the type number CD 100. In this apparatus the amplitude of the detection signal, after this detection signal has been filtered in a high-pass filter in order to remove low-frequency variations, is used for detecting a loss of track. However, detecting only the amplitude of the high-frequency signal has the disadvantage that decreases in signal amplitude due to of other causes, such as fingermarks on the record carrier, may be interpreted as a loss of track. In order to preclude this, variations of the average value of the detection signal are also detected. Nevertheless, the use of a high-pass filter has the disadvantage that pulse-shaped signal variations, such as produced by a signal drop-out due to a defect in the disc, result in an error propagation due to the impulse response of said filter.

Applicant's copending U.S. application Ser. No. 589,386, filed concurrently herewith, relates to apparatus similar to that described herein but does not address the track-loss problem to which the present invention is directed.

SUMMARY OF THE INVENTION

It is the object of the invention to provide an apparatus of the type specified in the opening paragraph in which loss of track can be detected in a simple yet reliable manner.

To this end the invention is characterized in that the track-loss detection means effect a comparison between a first signal supplied by the detector during scanning of the optically detectable pit areas and a second signal supplied by the detector during scanning of the intermediate land areas, and the track-loss signal is generated when the first signal is larger than a predetermined fraction of the second signal.

This method of detecting loss of track automatically distinguishes between signal variations as a result of loss of track, which results in an increase of the signal during scanning of the optically detectable pit areas, and signal variation as a result of fingermarks which results in a decrease of the signal during scanning of the intermediate land areas.

In order to preclude erroneous loss of track detection during signal drop-outs the apparatus in accordance with the invention may be further characterized in that the apparatus comprises detection means for detecting signal drop-outs which are identified in that the first signal is substantially identical to the second signal, the track-loss detection means being adapted to inhibit the generation of a track-loss signal during the occurrence of such a signal drop-out.

In order to reduce the influence of variations in parameters, such as laser-light intensity and disc-reflection coefficient, the apparatus in accordance with the invention may be further characterized in that said fraction comprises a modulation factor which is determined by the average strength of the first signal and the average strength of the second signal.

In the known apparatus the track-loss signal is derived in a similar manner from the digital signals originating from the disc, which track-loss signal therefore often has a poor signal-to-noise ratio and is also frequently inaccurate because the information is disturbed by the irregular data signal.

To this end, an apparatus in accordance with the invention, in which the generation of the track-loss signal is improved, is characterized in that the apparatus comprises:

oscillator means for supplying a clock signal, an analog-to-digital converter which is clocked by the oscillator means for sampling the detection signal deteced by the detector both during scanning of pit areas and during scanning of land areas, detection means for identifying the detection signal samples as originating either from a pit or land area, and signal-separating means for separating, under command of the detection means, the samples taken during scanning of the pit areas and the samples taken during scanning of the land areas.

This apparatus may be further characterized in that the detection means are adapted to detect one sample per pit area and one sample per land area, the clock frequency being equal to or being a multiple of the bit frequency of the digital information being read.

By selecting one sample every time the instantaneous sampling frequency after selection will vary in accordance with the instantaneous information-signal frequency, so that cross-talk of spectral components of this information signal into said selected samples is minimal.

This apparatus in accordance with the invention is further characterized in that the detection means are adapted to detect said one sample only when the optically detectable areas and intermediate areas are longer than a predetermined number of periods of the bit frequency.

This step ensures that the influence of the optical transfer function, i.e. the amplitude of the signal read as a function of the length of the optically detectable areas, on the selected samples is minimal.

A preferred embodiment of an apparatus in accordance with the invention is characterized in that the signal-separating means comprise first and second storage means to which the samples are applied, the first storage means is gated by the detection means only upon detection of said one sample if this sample originates from a land area, and the second storage means is gated by the detection means only upon detection of said one sample if this sample originates from a pit area.

With respect to the detection means the preferred embodiment may be further characterized in that the detection means comprise counting means which are started upon every transition between a pit area and a land area and which are arranged to count in the rhythm of the clock signal of bit frequency and to generate a control signal for the first storage means when a predetermined count is reached while scanning a land area and a control signal for the second storage means when said predetermined count is reached while scanning a pit area, the samples being applied to the storage means with a delay of a predetermined number of clock periods.

BRIEF DESCRIPTION OF THE DRAWINGS

The invention will now be described in more detail, by way of example, with reference to the drawings, in which:

FIG. 2 shows an example of the detector 19 of the apparatus shown in FIG. 1, FIG. 3, consisting of a-j, shows some diagrams to explain the operation of the detector shown in FIG. 2.

DESCRIPTION OF THE PREFERRED EMBODIMENTS

Figure 1:
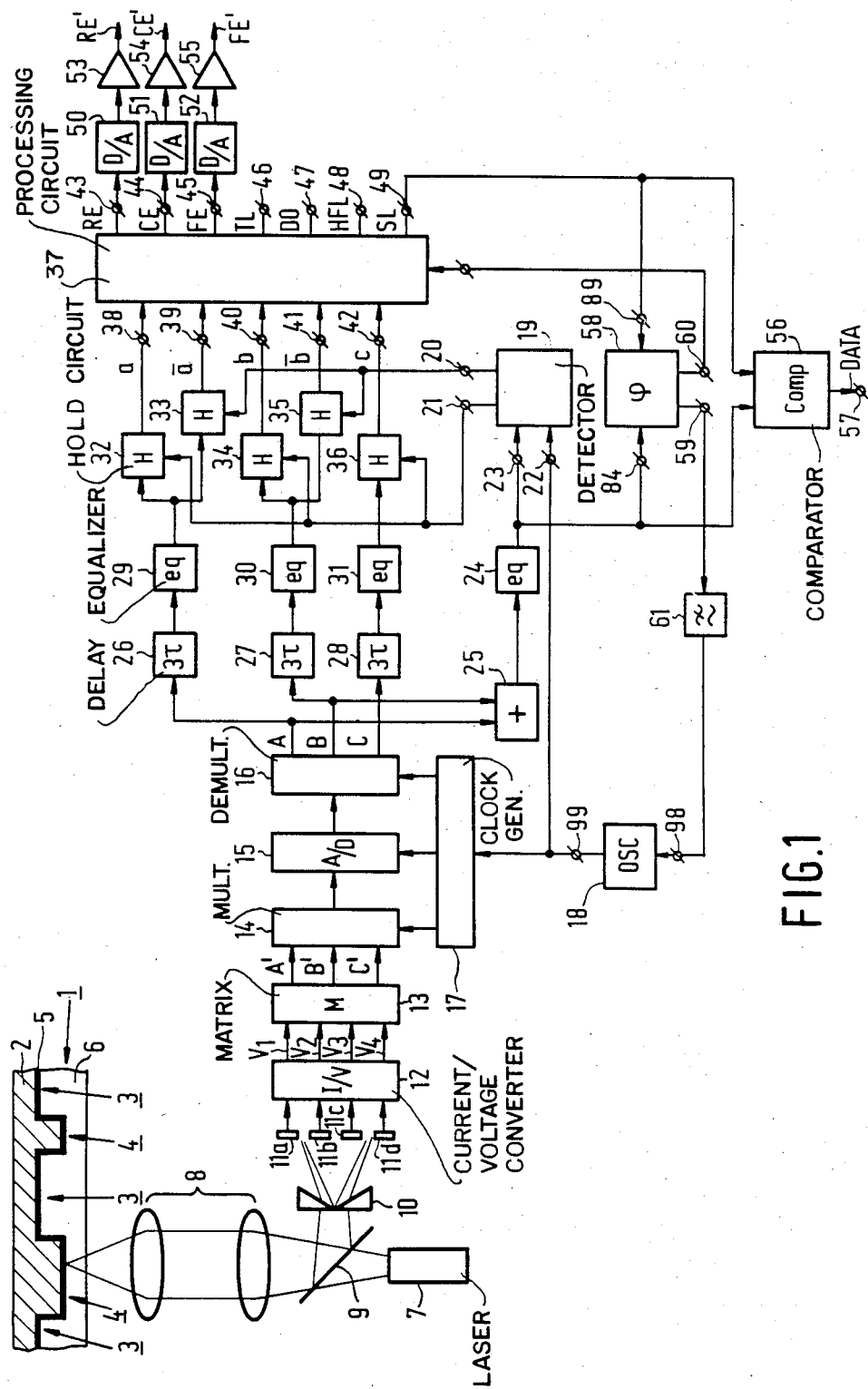
FIG. 1 shows the block diagram of an apparatus to which the steps in accordance with the invention may be applied.

FIG. 1 shows an apparatus to which the steps in accordance with the invention may be applied. In this figure a disc-shaped record carrier 1 is shown in a schematic cross-sectional view. This record carrier comprises a substrate 2 in which a track structure is formed, which structure comprises pits 3 and lands 4. This relief-type track structure is coated with a reflecting layer 5 and a transparent protective layer 6. The information contained in the relief-type track structure is read in that a laser beam generated by a laser 7 is projected and focused on the tracks via a lens system 8, the reflected beam being projected on an in-line array of four optical detectors 11a, 11b, 11c and 11d via a semi-transparent mirror 9 and a beam splitter 10. The currents supplied by these photodetectors are converted into the signal voltages $V_1$, $V_2$, $V_3$ and $V_4$ by means of a current-voltage converter 12.

For a correct read-out the focusing of the lens system 8 is controlled in a manner, not shown, by means of a focusing control signal FE'. For radial tracking the radial location of the spot produced by the laser beam is controlled by means of a radial control signal RE'. This is a fine-control system. Coarse control is obtained (in a manner not shown) by moving the entire optical system 7, 8, 9, 10, 11 in a radial direction under command of a control signal CE'.

The control signals CE', RE' and FE' are derived from the signal voltages $V_1$, $V_2$, $V_3$ and $V_4$. In addition to the sum $V_1+V_2+V_3+V_4$ required for recovering the high-frequency data signal, the signal $(V_1+V_4)-(V_2+V_3)$ is required for the signal FE' and the signal $(V_1+V_2)-(V_3+V_4)$ is required for the signal CE' and the signal RE'. All these control signals can be derived from three signals A', B' and C' which are obtained by combining the signals $V_1$, $V_2$, $V_3$ and $V_4$. In the present embodiment these signals are related as follows:

$$A'=V_1+V_2$$

$$B'=V_3+V_4$$

$$C'=V_1+V_4.$$

The combination of the signals $V_1$, $V_2$, $V_3$ and $V_4$ described in the foregoing is obtained by means of a matrix 13. This combination has the advantage that only three instead of four signals must be digitized, so that a local lower clock frequency is required than in the case that these signals are digitized serially. For this purpose the signals A', B' and C' are converted into serial form by means of a multiplexer 14, they are digitized in an analog-to-digital converter 15 and they are reconverted into parallel form to obtain the corresponding digital samples A, B and O by means of a demultiplexer 16. The multiplexer 14, the analog-to-digital converter 15 and the demultiplexer 16 receive clock signals from a clock-signal generating circuit 17, which supplies the required clock signals in the correct phase relationship under control of an oscillator 18, in such a manner that the samples A, B and C are supplied in synchronism with the bit frequency of the data signal.

For generating the various control signals it is important to suppress the data-signal spectrum as far as possible. This is achieved by selecting samples in synchronism with the data pattern (pit and land), so that the instantaneous sampling frequency becomes equal to the instantaneous frequency of the data signal. For this purpose one sample for each pit (3) and for each land area (4) is selected from each of the samples A, B and C and, in order to minimize the effect of the optical transfer function of the read-out (the signal amplitude is a function of the location of the projected laser beam relative to the pits and decreases toward the edges of the pits), the samples are taken only for pits and land areas which are longer than a specific number of clock periods, in the present example longer than 5 clock periods. For this purpose a detector 19 (which will be described in more detail with reference to FIG. 2) generates a pulse on an output 20 when the sixth sample in one pit is detected and a pulse on output 21 when the sixth sample in one land area is detected. The detector 19 receives the clock signals from the oscillator 18 on an input 22 and the digital sum of the signals A and B, obtained by means of the adder 25 and equalized by means of the circuit 24, on an input 23.

The samples A, B and C are each delayed by three clock periods ($\tau$) of the oscillator 18 by means of delay networks, 26, 27 and 28 respectively, are equalized by means of the equalizers 29, 30 and 31 respectively, and are applied to the hold secircuits 32 and 33, 34 and 35, and 36 respectively. The hold circuits 32, 34 and 36 are gated by the signal on output 21 of the detector 19 and the hold circuits 33 and 34 are gated by the signal on output 20. During each land area longer than five periods the third samples a, b and c of the samples A, B and C respectively, then appear on the outputs 38, 40 and 42, respectively, of the hold circuits 32, 34 and 36, respectively; and during each pit which is longer than five clock periods the third samples $\bar{a}$ and $\bar{b}$ of the samples A and B, respectively, then appear on the outputs 39 and 41, respectively, of the hold circuits 33 and 35, respectively.

It is to be noted that in principle it is also possible to select the sample depending on the length of the pit or land area, for example by taking the central sample in the case of long pits and land areas.

The signals a, ā, b, b̄ and c are applied to a processing circuit 37 (which is described in more detail with reference to FIGS. 4, 6 and 13), which supplies the signals RE, CE and FE on outputs 43, 44 and 45, respectively, and a signal TL representing a loss of track, a signal DO indicating a signal drop-out, a signal HFL indicating that the level of the high-frequency data signal is too low, and a signal SL which is a decision level for the data-signal processing, on outputs 46, 47, 48 and 49, respectively. The signals RE, CE and FE are converted into analog signals by means of digital-to-analog converters 50, 51 and 52 and subsequently they are amplified by the amplifier 53, 54 and 55 to form the analog control signals RE', CE' FE' for focusing and tracking control.

The sum of the signals A+B formed by means of the adder 25 and the equalizer 24 is not only applied to a detector 19 but also to a comparator 56 which also receives the decision level SL for restoring the digital data signal and applying it to an output 57 and to a phase comparator circuit 58, which compares the phase of the samples A+B with the phase of the data signal on the record carrier 1 and which supplies a signal which is a measure of this phase to an output 59 and a signal which is a measure of the asymmetry of the signal A+B to an output 60, which last-mentioned signal is applied to a circuit 37, which will be described in more detail with reference to FIG. 8. The phase-error signal on output 59 controls the oscillator 18 via a low-pass filter 61.

FIG. 2 shows an example of the detector 19 in the apparatus shown in FIG. 1, and FIG. 3 shows some diagrams to explain the operation of the circuit shown in FIG. 2. In the circuit shown in FIG. 2 the signal A+B from the equalizer 24 is applied to a high-pass filter 62 via an input 23 in order to remove the low-frequency components, thereby enabling the digital data signal to be restored by means of a simple comparator 63. The edges of the rectangular data signal are detected by means of a circuit 64, for example a differentiator. This edge detector starts a counter 65 which counts the clock pulses (from the oscillator 18) on its input 22 from the instant defined by the pulses from the edge detector 64. A decoder circuit 66 decodes a specific count, in the present example six. When the count "six" is reached, the pulses are applied to AND-gates 67 and 68. The gate 67 also receives the restored data signal on an inverting input and the gate 68 receives this signal on a non-inverting input. As a result of this, a pulse will appear on output 21 when the count "six" is reached during a positive data signal (3c) and on output 20 when the count "six" is reached during a negative data signal.

To illustrate this, FIG. 3a shows a part of a data track on the record carrier, which track comprises pits 3 and land areas 4 between these pits. FIG. 3b shows the samples A+B originating from the track shown in FIG. 3a. FIG. 3c shows the restored data signal after the comparator 63, which is a substantially rectangular signal with a period corresponding to the length of the pits and intermediate areas. FIG. 3d shows the starting pulses for the counter 65 formed on the edges of the data signal, which counter counts the pulses of the clock signal shown in FIG. 3e. The counter 65 supplies a pulse each time that the count "six" is reached and for a positive data signal (FIG. 3c), i.e. during a land area, a pulse will appear on output 21 (FIG. 3f), whilst for a negative data signal, i.e. during a pit, the pulse will appear on output 20 (FIG. 3g). The signals A, B and C, which have been delayed by three clock periods, are thus sampled. FIG. 3h shows the signal A which has been delayed by three clock periods and for which the hold circuit 32 (FIG. 1) holds the third sample from each land area longer than five clock periods (signals shown in FIG. 3i) and, the sample and hold circuit 33 holds the third sample from each pit longer than five clock periods (signal shown in FIG. 3j).

Figure 4:
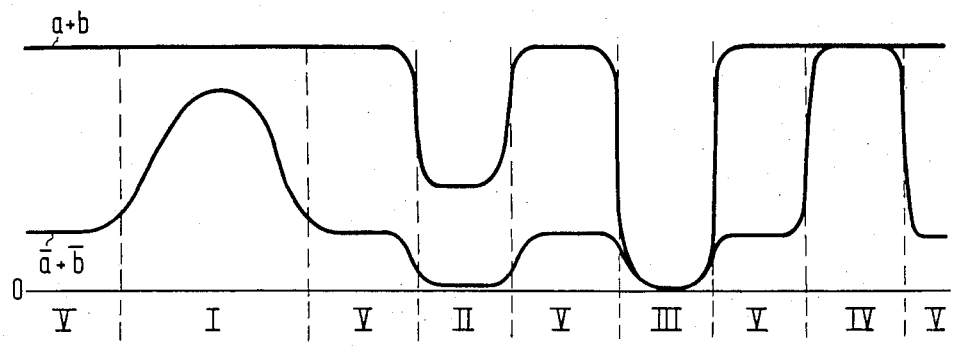
FIG. 4 is a diagram to explain the operation of the circuit shown in FIG. 5
Figure 5:
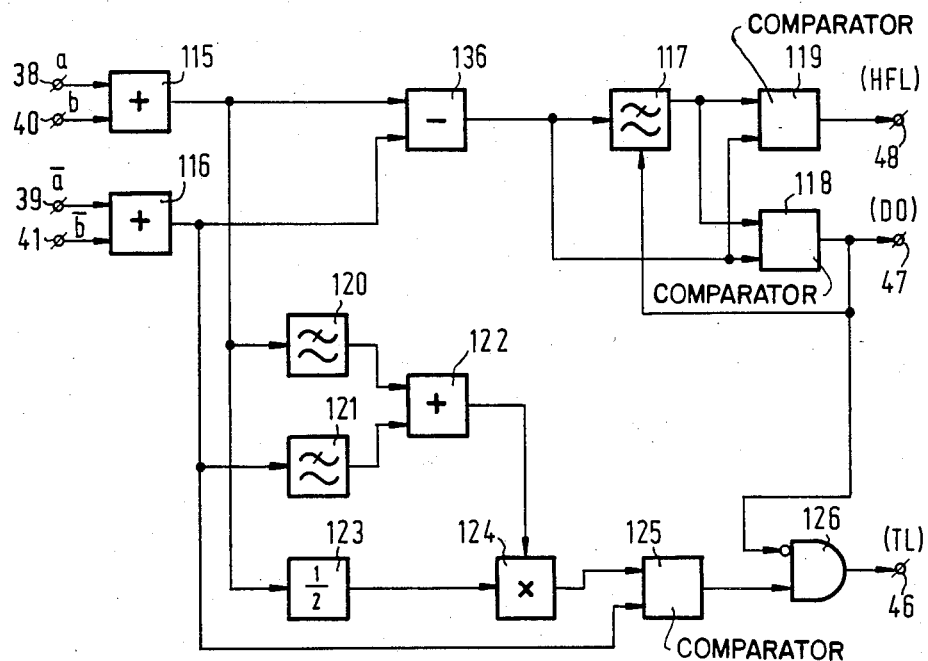
FIG. 5 is an example of that part of the circuit 37 (FIG. 1) which supplies the signals TL, DO and HFL in conformity with the invention.

FIG. 5 shows an example of that part of the circuit 37 (FIG. 1) which supplies the signals TL, DO and HFL, FIG. 4 illustrating some faults which may occur during the reproduction of the data from a disc. The variation of the signals a+b (the sum of the samples a and b taken during long land areas) and ā+b̄ (the sum of the samples ā and b̄ taken during long pits) is plotted in FIG. 4. The ranges V represent the values of the signals during undisturbed reproduction. In the range I loss of track occurs. The signal a+b produced by the land areas does not vary, whilst the signal ā+b̄ increases substantially because more light is reflected from the lands between the tracks. In range II a fingermark occurs. The reflection from both the pits and land areas decreases and both signals have become smaller. In range III a "black" signal drop-out occurs, so that neither the land areas nor the pits reflect any light and consequently both the signal a+b and the signal ā+b̄ become zero. Such a signal drop-out may for example occur if the reflecting layer 5 of the disc is missing locally. In range IV a "white" signal drop-out occurs, the signal ā+b̄ then becoming equal to the signal a+b, which for example occurs in the case of the local absence of pits on the disc.

A suitable criterion for determining a signal drop-out is the criterion that the high-frequency signal amplitude, i.e. the difference between the signal at the location of a land area and at location of a pit or, if limited to samples during long pits and land areas, the signal (a+b)−(ā+b̄) decreases to a specific extent. In the circuit shown in FIG. 5 the adder 115 therefore determines the sum of signals a and b and the adder 116 determines the sum of the signals ā and b̄, whilst the subtractor circuit 136 forms the difference signal (a+b)−(ā+b̄). In order to detect the decrease of this signal a low-pass filter 117 determines the average of this signal, which average is compared with the instantaneous value of the signal in the comparator 118. If this instantaneous value is, for example, less than 15% of the average value, a signal (DO) is supplied to the output 47. In addition, a comparator 119 determines whether the instantaneous signal (a+b)−(ā+b̄) is smaller than for example 50% of the average value and, if this is the case, a signal (HFL) is produced on output 48 as a sign that the data signal has dropped out. Thus, this signal HFL is not only produced during a signal drop-out (situations III and IV in FIG. 4) but for example also in the case of fingermarks (situation III) and loss of track (situation I).

As, for example in the case of fingermarks, the disturbance may be less serious, the time constant of the filter 117 is comparatively small so that the average (a+b)−(ā+b̄) decreases relatively fast in the case of, for example, fingermarks (situation II) and the signal HFL will disappear in the case of prolonged disturbances. In the case of signal drop-outs as in the situations II and IV this is not permissible. Therefore, the signal DO switches the time constant of the filter 117 to a substantially higher value during such faults. During faults for which the signal decreases to a level between 15 and 50% of the undisturbed level, the filter 117 operates with a small time constant and during faults for which the signal decreases to a level below 15% it operates with a large time constant.

In order to detect loss of track it is ascertained whether the signal during the pits $(\bar{a}+\bar{b})$ is larger than a specific fraction $\alpha$ (for example $\alpha=0.5$) of the signal during the land areas $(a+b)$, or:

$$\bar{a}+\bar{b}>\alpha(a+b).$$

However, since in particular the magnitude of the signal $(a+b)$ in the pits depends on the disc quality and these signals also depend on, for example, the laser light beam intensity, it is necessary, in order to make the detector independent of these parameters, that the factor $\alpha$ depend on these parameters by making it dependent on the modulation factor. This modulation factor is, for example, the average of the average value of the signal $\bar{a}+\bar{b}$ and the average value of the signals $a+b$. In the apparatus shown in FIG. 5 the signals $a+b$ and $\bar{a}+\bar{b}$ on the outputs of the adders 115 and 116 respectively are therefore averaged with low-pass filters 120 and 121 respectively and the sum of the averages is taken by means of the summing device 122. The signal $a+b$ on the output of the adder 115 is halved by the divider 123 and subsequently multiplied by the output signal of the divider 122 in the multiplier 124. The output signal of this multiplier 124 is compared with the output signal $\bar{a}+\bar{b}$ of the adder 116 in the comparator 125, thus yielding an output signal in conformity with the aforementioned criterion $\bar{a}+\bar{b}>\alpha(a+b)$, where $\alpha=\frac{1}{2}\times\{\text{average of }(\bar{a}+\bar{b})+\text{average }(a+b)\}$. Since this criterion is also valid for signal drop-outs in accordance with situation IV, this signal is combined with the inverse of the signal DO in an AND-gate 126, thereby inhibiting AND-gate 126 so that on output 46 a signal TL appears which is indicative of situation I only.

What is claimed is:

1. An apparatus for reproducing information from an optically readable record carrier on which the information is digitally stored in the form of a track of optically detectable pit areas which alternate with intermediate land areas, such apparatus comprising:
   an optical system for projecting a light beam which produces a spot of light on the record carrier which is reflected therefrom and modulated thereby;
   an optical detector for detecting the light beam reflected from the record carrier and generating a first detection signal corresponding to the modulation produced by pit areas of said track and a second detection signal corresponding to the modulation produced by land areas of said track; and
   track-loss detection means coupled to said optical detector for generating a track-loss signal which is an indication of a condition in which the spot of light produced on the record carrier by the light beam is positioned off the track to a specific extent, such track-loss signal being generated when said first detection signal exceeds a predetermined fraction of said second detection signal.

2. An apparatus as claimed in claim 1, further comprising signal drop-out detection means coupled to said optical detector for detecting occurrence of a signal drop-out condition which is identified in that said first and second detection signals become substantially identical; the signal drop-out detection means being adapted to then produce a drop-out signal which is applied to said track-loss detection means to inhibit it from generating a track-loss signal during a signal drop-out condition.

3. An apparatus as claimed in claim 1, in which said predetermined fraction is a modulation factor determined by said track-loss detection means from the average of the average strengths of the first and second detection signals.

4. An apparatus as claimed in claim 1, further comprising:
   oscillator means for supplying a clock signal;
   an analog-to-digital converter which is clocked by the clock signal to sample the detection signals generated by said optical detector during scanning of pit areas and during scanning of land areas of said track;
   detection means coupled to said analog-to-digital converter for identifying the sampled detection signals produced thereby originating from pit areas of said track and the sampled optical detection signals produced thereby originating from land areas of said track; and
   signal-separating means for separating, under control of said detection means, the detection signal samples originating from pit areas of said track from the detection signal samples originating from land areas of said track.

5. An apparatus as claimed in claim 4, wherein said detection means is adapted to identify only one detection signal sample from any pit area of said track and only one detection signal sample from any land area of said track, and the clock signal frequency is equal to or a multiple of the frequency of the digital bits of the information reproduced from the record carrier.

6. An apparatus as claimed in claim 5, wherein said one detection signal samples originate from pit and land areas of said track which are longer than a predetermined number of periods of the frequency of the digital bits of the information reproduced from the record carrier.

7. An apparatus as claimed in claim 4, wherein said signal-separating means comprises: first and second signal-separating storage means coupled to said analog-to-digital converter to receive the detection signal samples produced thereby, the first storage means being gated by said detection means to store detection signal samples originating from pit areas of said track and the second storage means being gated by said detection means to store detection signal samples originating from land areas of said track.

8. An apparatus as claimed in claim 7, wherein said detection means comprises counting means which begins counting at every transition between a detection signal sample originating from a pit area of said track and a detection signal sample originating from a land area of said track, such count being in synchronism with the clock signal; said counting means generating a gating signal for the first storage means when a predetermined count is reached following identification of a detection signal sample originating from a land area of said track and generating a gating signal for the second storage means when said predetermined count is reached following identification of a detection signal sample originating from a pit area of said track; the detection signal samples being applied to said storage means with a delay corresponding to a predetermined number of periods of the clock signals.

* * * * *